(12) United States Patent
Boerstler et al.

(10) Patent No.: US 7,519,498 B2
(45) Date of Patent: Apr. 14, 2009

(54) THERMAL SENSING METHOD AND APPARATUS USING EXISTING ESD DEVICES

(75) Inventors: David W. Boerstler, Round Rock, TX (US); Eskinder Hailu, Austin, TX (US); Kazuhiko Miki, Round Rock, TX (US); Jieming Qi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 11/242,675

(22) Filed: Oct. 4, 2005

(65) Prior Publication Data

US 2007/0075370 A1 Apr. 5, 2007

(51) Int. Cl.
*G06F 3/00* (2006.01)

(52) U.S. Cl. .................. 702/130; 702/132; 702/179; 702/183

(58) Field of Classification Search ............ 702/57, 702/65, 124, 183, 187, 188, 199, 130, 132, 702/179; 235/454; 340/572.4; 374/178, 374/185; 710/115
See application file for complete search history.

(56) References Cited

U.S. PATENT DOCUMENTS

| | | | | |
|---|---|---|---|---|
| 6,149,299 A | * | 11/2000 | Aslan et al. | 374/178 |
| 6,629,638 B1 | * | 10/2003 | Sanchez | 235/454 |
| 6,808,307 B1 | * | 10/2004 | Aslan et al. | 374/178 |
| 6,890,097 B2 | * | 5/2005 | Tanaka | 374/185 |

* cited by examiner

Primary Examiner—Eliseo Ramos Feliciano
Assistant Examiner—Felix E Suarez
(74) Attorney, Agent, or Firm—Stephen J. Walder, Jr.; Matthew B. Talois

(57) ABSTRACT

The present invention provides a method, an apparatus, and a computer program product for measuring the temperature of a microprocessor through the use of ESD circuitry. The present invention uses diodes and an I/O pad within ESD circuits to determine the temperature at the location of the ESD circuitry. First, a current measuring device connects to a diode. A user or a computer program disables the protected component or circuitry, and subsequently applies a predetermined voltage to the I/O pad. This creates a reverse saturation current through the diode, which is measured by the current measuring device. From this current the user or a computer program determines the temperature of the microprocessor at the diode through the use of a graphical representation of diode reverse saturation current and corresponding temperature.

14 Claims, 4 Drawing Sheets

THERMAL SENSING METHOD AND APPARATUS USING EXISTING ESD DEVICES

FIELD OF THE INVENTION

The present invention relates generally to sensing temperatures on a microprocessor, and more particularly, to a method to sense temperatures on a microprocessor by measuring the current through existing ESD devices.

DESCRIPTION OF THE RELATED ART

The die temperature of a microprocessor directly affects system performance and reliability. Microprocessor components operate accurately within ideal temperature ranges. Therefore, it is important to ensure that the microprocessor remains within a specific operating temperature range. Average die temperatures may be sensed by direct or indirect means. Accordingly, system adjustments such as fan speed or global clock frequency can be made to compensate for temperatures that are not within the correct range. Local temperature variations on the die may also be sensed to allow active adjustments of workload via clock gating or other means. Thermal sensing is also important for fault isolation or diagnostic purposes because temperature readings can point out faults within the microprocessor.

The current solutions for temperature sensing require temperature sensors that are strategically placed on the die. The system accesses these sensors through dedicated logic or through dedicated input/output (I/O) pins to external interface circuits. Examples of on-chip temperature sensors may include forward biased diodes or temperature-sensitive oscillators. Drawbacks of conventional methods of temperature sensing include the additional power required, complexity, area, cost, and implementation of the integration resource. It is clear that a superior method of sensing temperatures on-chip, which reduces the drawbacks of conventional methods, is necessary.

SUMMARY OF THE INVENTION

The present invention provides a method, an apparatus, and a computer program product for measuring the temperature of a microprocessor through the use of electro-static discharge ("ESD") circuitry. ESD circuitry protects components or circuits from excessively high or low voltages and currents. The present invention uses diodes and an I/O pads within ESD circuits to determine the temperature at the location of the ESD circuitry. First, a current measuring device connects to a diode. A user or a computer program disables the protected component or circuitry, if necessary, and subsequently applies a predetermined voltage to the I/O pad. The predetermined voltage is the supply voltage if the diode is connected to ground, or is the ground voltage if the diode is connected to supply voltage. This creates a reverse saturation current through the diode, which is measured by the current measuring device. From this current, the user or a computer program determines the temperature of the microprocessor at the diode through the use of a graphical representation of diode reverse saturation current and corresponding temperature.

In one embodiment of the present invention, the graphical representation of diode reverse saturation current and corresponding temperature is kept accurate through the use of a calibration method. Furthermore, the present invention supports the aggregation of the reverse saturation currents of multiple diodes to provide an average temperature of the microprocessor. Also, the present invention allows a user or a computer program to utilize the reverse current measurements at multiple diodes to produce a thermal map of the microprocessor.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

The present invention involves using the electro-static discharge (ESD) circuitry that already exists on the microprocessor chip for temperature sensing. The ESD circuitry in conjunction with additional measuring circuitry can sense either local or average chip temperature. The additional circuitry can be off-chip such that thermal sensing can be accomplished without any additional on-chip requirements beyond the normal ESD signal I/O requirements. The present invention requires no on-chip additional power, complexity, area cost, or integration resource to implement.

Figure 1:
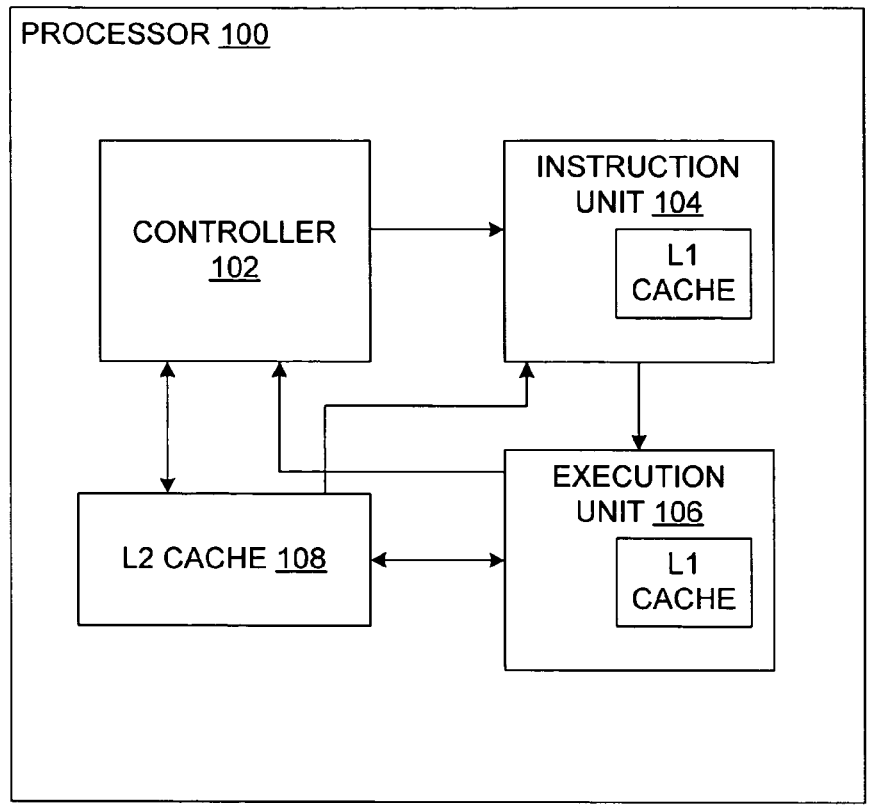
FIG. 1 is a block diagram of a processor or microprocessor that could contain ESD structures.

FIG. 1 is a block diagram of a processor or microprocessor that could contain ESD structures. This processor contains controller 102. Controller 102 controls the flow of data into and out of the processor 100. Controller 102 sends control signals to instruction unit 104. Instruction unit 104 houses an L1 cache. Instruction unit 104 issues instructions that are sent to execution unit 106. Execution unit 106 also houses an L1 cache. Execution unit 106 executes the instructions and stores or forwards the data results. L2 cache 108 can store instructions or data results. Execution unit 106 retrieves data from L2 cache 108 when necessary to execute instructions. Instruction unit 104 also retrieves data from L2 cache 108 when necessary. Controller 102 sends signals to control the storage or retrieval of data to or from L2 cache 108. Processor 100 may contain many other components that are not shown in FIG. 1. FIG. 1 is a basic representation of a processor and does not limit the scope of the present invention.

Figure 2:
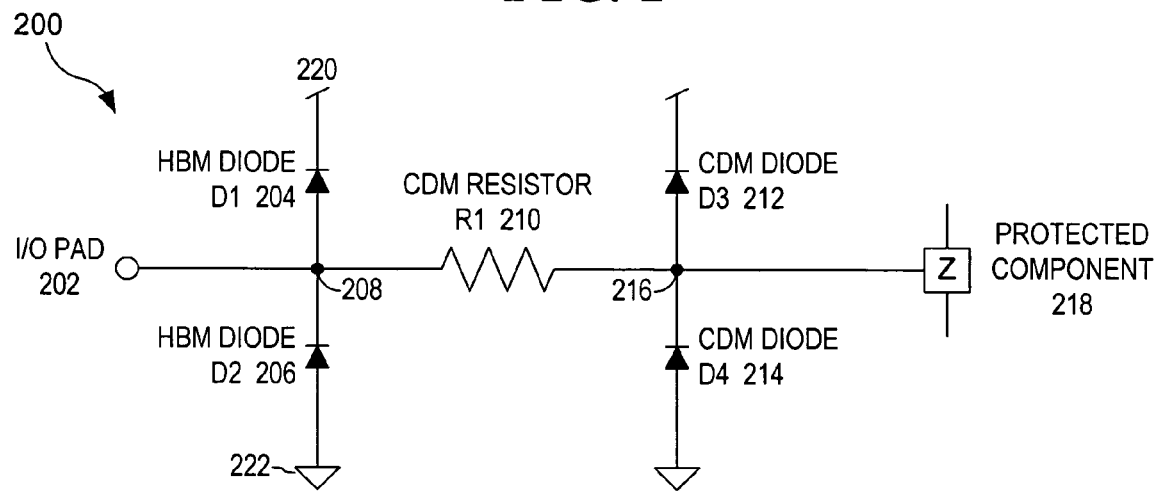
FIG. 2 is a schematic diagram of a conventional ESD circuitry that can be implemented to measure the on-chip temperature.

FIG. 2 is a schematic diagram of a conventional ESD circuitry 200 that can be implemented to measure the on-chip temperature. FIG. 2 only depicts one example of an ESD circuit, and ESD devices may comprise many different configurations. FIG. 2 represents the ESD protection that would be used for a general purpose low frequency driver-receiver circuit. I/O pad 202 refers to an I/O pin on the chip that contains this circuit 200. Accordingly, the ESD circuitry 200 prohibits protected component 218 from receiving too high or too low of a voltage. FIG. 2 could represent a driver circuit, wherein protected component 218 drives the output signal through I/O pad 202, or a receiver circuit, wherein protected component 218 receives the input signal from I/O pad 202. The ESD protection results from the configuration of the diodes 204, 206, 212, 214.

I/O pad 202 connects to a node 208. Two human body model (HBM) diodes 204, 206 also connect to node 208. The anode of HBM diode D1 204 connects to node 208 and the cathode connects to supply voltage 220. The anode of HBM diode D2 206 connects to ground voltage 222 and the cathode connects to node 208. Resistor R1 210 connects to node 208 and node 216. Two charge distribution model (CDM) diodes 212, 214 connect to node 216. The anode of CDM diode D3 212 connects to node 216 and the cathode connects to supply voltage 220. The anode of CDM diode D4 214 connects to ground voltage 222 and the cathode connects to node 216. Protected component 218 also connects to node 216. In this configuration, CDM diodes 212, 214 in conjunction with CDM resistor RI 210 provide the ESD protection. Other configurations may only contain HBM diodes or CDM diodes, but these types of configurations may be inadequate at fully protecting the component 218.

These diodes 204, 206, 212, 214 protect protected component 218 by diverting harmful current away from protected component 218 and limiting the voltage extremes. For example, supply voltage 220 is 5 Volts and ground supply is 0 Volts. This indicates that protected component 218 will be shielded from voltages above 5V+a diode drop (~0.7 V for low currents), or 5.7 V, and below 0V—a diode drop, or –0.7 V. If greater than 5.7 V is applied to I/O pad 202, the corresponding current runs from node 208 to supply voltage 220 through HBM diode D1 204. HBM diode D1 204 is in forward bias mode. CDM diode D3 212 produces the same result. Therefore, the ESD circuit 200 diverts the possibly harmful current away from protected component 218. If less than –0.7 V is applied to I/O pad 202, the corresponding current runs from ground voltage 222 to node 208 through HBM diode D2 206. HBM diode D2 206 is in forward bias mode. CDM diode D4 214 produces the same result. Therefore, the ESD circuit 200 ensures that a possibly harmful current is not taken from protected component 218.

By applying an external positive or negative bias to the pad greater than the supply voltage or less than ground, the diodes can be placed in forward bias in a more conventional thermal sensing mode. Accordingly, the current through a diode is directly related to the temperature of the diode. As described above, a bias greater than 5 V places diodes 204, 212 in forward bias and a bias less than 0 V places diodes 206, 214 in forward bias. Therefore, a graph can provide the temperature of the diode based upon the current through the diode. The problem with this approach is that the external positive or negative bias can potentially stress the protected components 218, so applying these voltages is generally not a good idea.

Alternatively, in a preferred embodiment sensing the reverse saturation currents of the diodes can also determine the temperature. To get a reverse saturation current, an outside source applies supply voltage 220 or ground voltage 222 to I/O pad 202. This produces a reverse saturation current that is constant. This current is similar to a leakage current. A graph can provide the temperature of the diode based upon the reverse saturation current through the diode. The simplified theoretical diode current (Schockley equation) under reverse—bias conditions is:

$$I_0 = T^2 e^{(-Vgo/VT)} A K$$

wherein:
T=absolute temperature
Vgo=bandgap voltage
VT=thermal voltage
A=diode area (or perimeter for SOI)
K=constant A more exact equation can be written which takes into account the generation-recombination process, which is included in the simulation models. This application does not provide this equation and focuses primarily on the exponential relationship between reverse saturation current and temperature.

Figure 3:
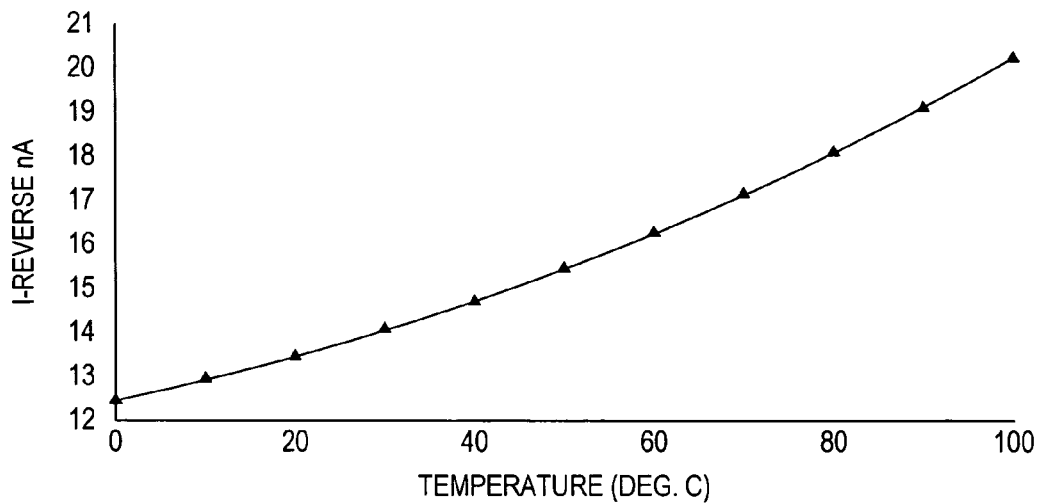
FIG. 3 is a graphical representation of ESD diode reverse current vs. temperature.

FIG. 3 is a graphical representation of ESD diode reverse current vs. temperature. This graph indicates the reverse current across a simple diode after applying a 1V reverse bias. The reverse current (nA) comprises the y-axis and temperature (C.°) comprises the x-axis. This graph shows less than 15% deviation from the simple theory. Accordingly, a user or a computer program can extrapolate a temperature in the local area of the diode from the reverse saturation current measurement through the diode.

Figure 4:
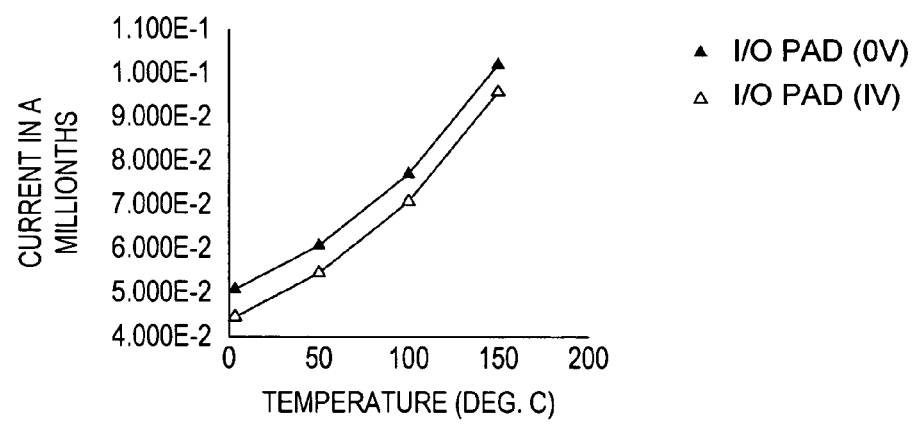
FIG. 4 is a graphical representation of ESD diode reverse current vs. temperature in a general purpose low frequency driver-receiver circuit with ESD protection.

FIG. 4 is a graphical representation of ESD diode reverse current vs. temperature in a general purpose low frequency driver-receiver circuit with ESD protection 200. By grounding or applying the supply voltage 220 to I/O pad 202, a similar reverse-biased condition occurs on a HBM diode 204, 206 and CDM diode 212, 214 in the ESD circuitry 200. The reverse current (A) comprises the y-axis and temperature (C.°) comprises the x-axis. For this graph the ground voltage 222 is 0V and supply voltage 220 is 1V. The top set of results indicates the temperature across diodes 206, 214 when 0V supplies I/O pad 202. The bottom set of results indicates the temperature across diodes 204, 212 when 1V supplies I/O pad 202. Accordingly, a user or a computer program can extrapolate a temperature in the local area of the diode from the current measurement through the diode.

Figure 5:
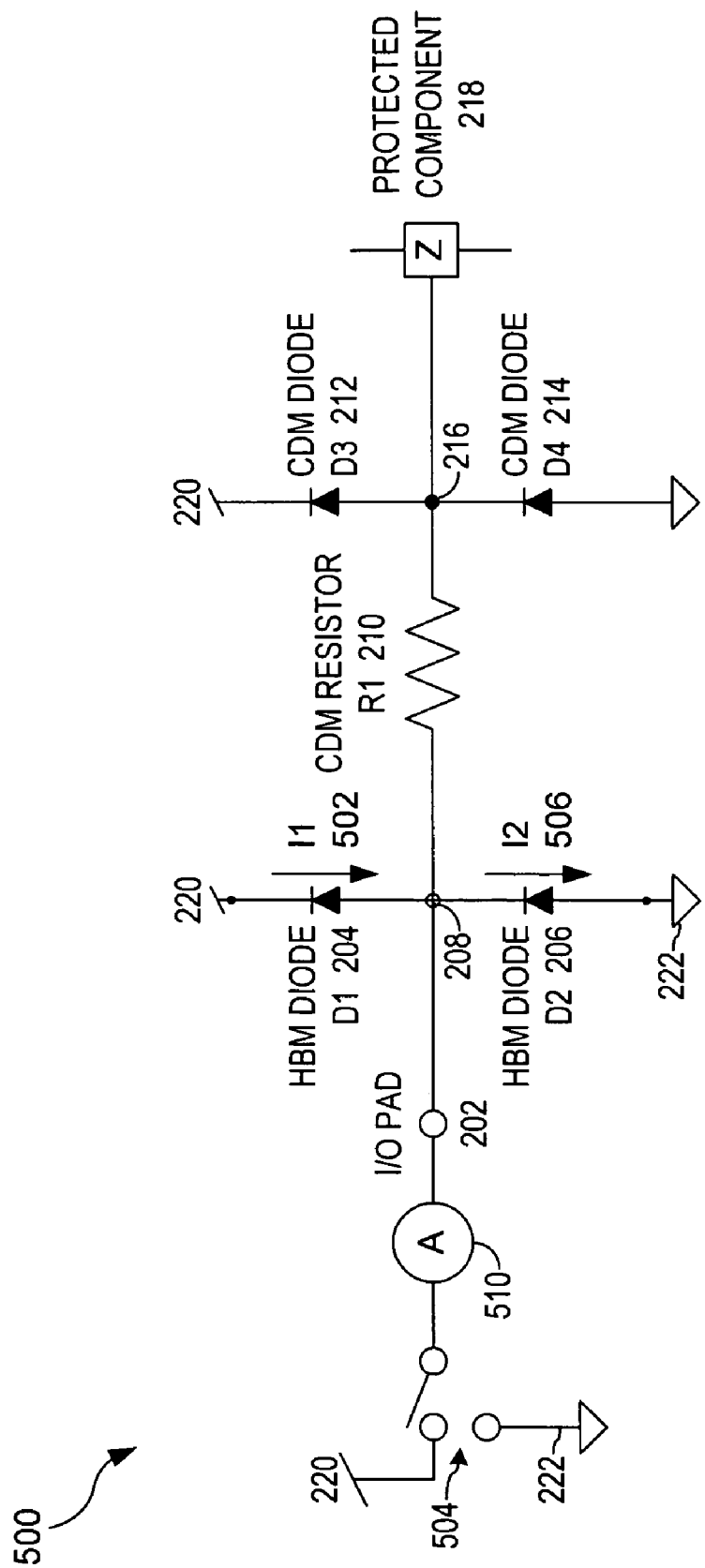
FIG. 5 is a schematic diagram of a conventional ESD device connected to one or more ammeters for measuring the reverse saturation current through the diodes.

FIG. 5 is a schematic diagram of a conventional ESD device 500 connected to one or more ammeters 510 for measuring the reverse saturation current through the diodes 204, 206. FIG. 5 represents the same conventional ESD device that is shown in FIG. 2 with connections to ammeter 510. Accordingly, ammeter 510 measures the current through HBM diode D1 204 or HBM diode D2 206. To properly test the reverse saturation currents a user or computer program should disable protected component 218, if applicable (a receiver does not have to be disabled). This can be accomplished by turning off the circuit, which contains protected component 218, or placing protected component 218 in a high resistance state. Measuring the current through CDM diodes 212, 214 is difficult since node 216 is not accessible externally and internal loading would be a concern for internal sensing.

A switch 504 applies ground voltage 222 or supply voltage 220 to ammeter 510. Ammeter 510 is also connected to I/O pad 202. To measure the reverse saturation current through HBM diode D1 204, a user or a computer program applies a voltage to ammeter 510 that matches ground voltage 222. This causes a reverse saturation current I1 502 in HBM diode D1 204. Accordingly, ammeter 510 connects to ground voltage 222 and node 208 to measure current I1 502. To measure the reverse saturation current through HBM diode D2 206, a user or a computer program applies a voltage to I/O pad 202 that matches supply voltage 220. This causes a reverse saturation current I2 506 in HBM diode D2 206. Accordingly, ammeter 510 connects to supply voltage 220 and node 208 to measure current I2 506.

FIG. 5 shows an ammeter 510 measuring the currents through the diodes 204 and 206, but theses currents can be measured through many different methods and by many different devices. The reverse saturation currents 502, 506 are small, so they must be measured with sensitive equipment. Nanoammeters, picoammeters, electrometers, or parametric analyzers can measure these currents externally. Sophisticated low-current measurement circuits with low voltage burden (the input offset voltage of the ammeter) or high-gain transimpedance or transconductance amplifiers can measure these currents on-chip. After the current is measured, a graph such as the graph in FIG. 4 can determine the temperature at that specific diode.

A microprocessor contains hundreds or perhaps thousands of signal I/O ESD structures 200 throughout the chip. Therefore, it is possible to sense the local temperature around each one of these ESD structures 200 and provide a thermal map of the chip. Furthermore, a user or a computer program can also determine an average temperature of the chip by aggregating the reverse saturation currents around the chip and sensing the aggregated current. A less sensitive ammeter can measure the aggregated current. For example, to aggregate the currents a user can connect multiple I/O pads 202 to supply voltage 220 and measure the current going through the supply voltage 220, which indicates the current through the diode 206. The diodes around the chip would be at different temperatures and contain different currents, but one measurement would provide an average of the chip.

To ensure accuracy, this system can use a calibration method. For calibration the system must periodically measure the reverse saturation currents at a known temperature. To achieve the desired temperature, the system could turn off the chip for a specific amount of time or heat up the chip to a specific temperature. After the chip reaches the desired temperature, the ammeter or other measuring device determines the reverse saturation current and a new graph like FIG. 3 can be created. Then a user or computer program determines the temperature later by measuring the current and using a graph like FIG. 3.

Figure 6:
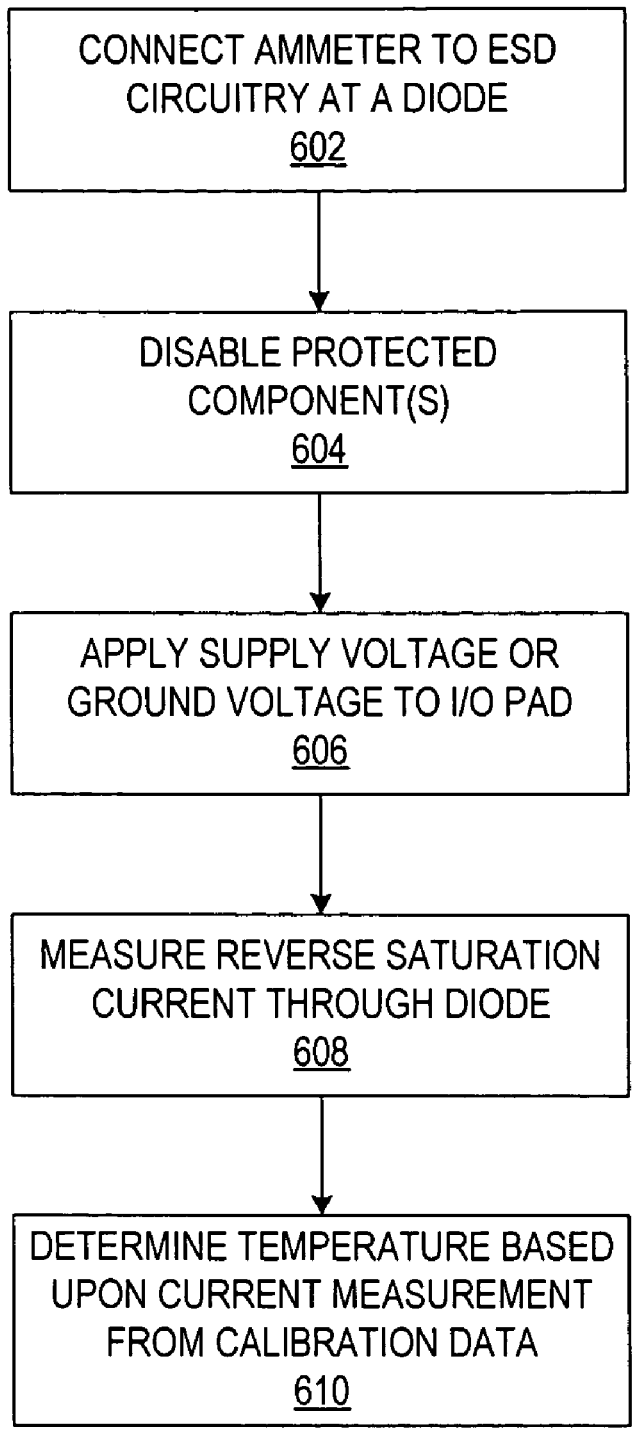
FIG. 6 is a flow chart illustrating a modified method of measuring the on-chip temperature.

FIG. 6 is a flow chart 600 illustrating a modified method of measuring the on-chip temperature. First, an ammeter 510 or similar current measuring device connects to a diode within the ESD circuitry 602. As previously described, these devices can measure these currents externally through pins on the chip or on-chip. The user or computer program disables the protected circuitry 604 to ensure that the protected component(s) 218 are not damaged or ensure that the component 218 does not interfere with the measuring device. Then, the user or computer program applies supply voltage 220 or ground voltage 222 to I/O pad 202 depending upon the diode tested 606. The ammeter measures the reverse saturation current through the diode 608. From the reverse saturation current measurement, a user or a computer program can determine the temperature at the diode 610 from the calibration data. Accordingly, multiple temperature measurements through the chip can provide a thermal map of the chip.

It is understood that the present invention can take many forms and embodiments. Accordingly, several variations of the present design may be made without departing from the scope of the invention. This invention can apply to any processor design that has a complex/long pipeline execution unit, such as an SIMD unit and a simple/short pipeline execution unit, such as a GP unit. The capabilities outlined herein allow for the possibility of a variety of networking models. This disclosure should not be read as preferring any particular networking model, but is instead directed to the underlying concepts on which these networking models can be built. The purpose of the present invention is to minimize the delay of simple execution instructions that are caused by complex execution instructions.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for measuring the temperature of a microprocessor through the use of existing electro-static discharge ("ESD") circuitry, wherein the ESD circuitry is coupled to at least one component and is configured to protect at least one component, comprising:

connecting at least one current measuring device to an input/output (I/O) pad of an existing ESD circuit of the microprocessor, wherein the at least one current measuring device is at least configured to measure a current through a diode within the existing ESD circuit;

disabling the at least one component that is protected by the existing ESD circuit;

applying a predetermined voltage to the existing ESD circuit, wherein the predetermined voltage creates a reverse saturation current through the diode within the existing ESD circuit;

measuring with the current measuring device a reverse saturation current through the diode within the existing ESD circuit;

determining the temperature of the microprocessor at the existing ESD circuit based upon the reverse saturation current measurement; and generating a thermal map of the microprocessor based on reverse saturation current measurements at a plurality of existing ESDs of the microprocessor by performing the connecting, disabling, applying, and measuring operations on the plurality of existing ESDs of the microprocessor.

2. The method of claim 1, wherein the step of connecting at least one current measuring device further comprises connecting the current measuring device externally wherein the current measuring device is located outside of the microprocessor.

3. The method of claim 1, wherein the step of connecting at least one current measuring device further comprises connecting the current measuring device internally wherein the current measuring device is located on the microprocessor.

4. The method of claim 1, wherein the step of applying a predetermined voltage to the ESD circuit further comprises:
   applying a supply voltage if the diode is connected to ground voltage; and
   applying a ground voltage if the diode is connected to supply voltage.

5. The method of claim 1, wherein the step of determining the temperature of the microprocessor further comprises determining the temperature from a graphical representation of diode reverse saturation current and corresponding temperature.

6. The method of claim 5, wherein the graphical representation of diode reverse saturation current and corresponding temperature is kept accurate through the use of a calibration method.

7. The method of claim 1, wherein the reverse saturation current measurements at multiple diodes can be aggregated to provide an average temperature of the microprocessor.

8. An apparatus for measuring the temperature of a microprocessor through the use of existing ESD circuitry, wherein the existing ESD circuitry is coupled to at least one component and is configured to protect at least one component, comprising:
   at least one existing ESD circuit in the microprocessor, wherein the ESD circuit comprises:
     at least one I/O pad; and
     at least one diode;
   at least one current measuring device, coupled to the at least one diode I/O pad of the at least one existing ESD circuit in the microprocessor, that is at least configured to measure a reverse saturation current through the at least one diode of the at least one existing ESD circuit; and
   a switch coupled to the at least one current measuring device for coupling the at least one I/O pad to one of a source voltage or ground to thereby apply a predetermined voltage to the I/O pad, wherein:
     the predetermined voltage creates a reverse saturation current through the at least one diode of the at least one existing ESD circuit, wherein the at least one component is disabled prior to measuring the reverse saturation current through the at least one diode of the at least one existing ESD circuit.
     the temperature of the microprocessor at the existing ESD circuit is determined based upon the reverse saturation current measurement, and
     a thermal map of the microprocessor is generated based on reverse saturation current measurements at a plurality of the at least one existing ESDs of the microprocessor using a plurality of current measuring devices of the at least one current measuring device.

9. The apparatus of claim 8, wherein the current measuring device is externally located outside of the microprocessor.

10. The apparatus of claim 8, wherein the current measuring device is internally located on the microprocessor.

11. The apparatus of claim 9, wherein the means for applying a predetermined voltage to the I/O pad further comprises:
    applying a supply voltage if the diode is connected to ground voltage; and
    applying a ground voltage if the diode is connected to supply voltage.

12. The apparatus of claim 8, wherein the means for determining the temperature of the microprocessor further comprises means for determining the temperature from a graphical representation of diode reverse saturation current and corresponding temperature.

13. The apparatus of claim 12, wherein the graphical representation of diode reverse saturation current and corresponding temperature is kept accurate through the use of a calibration method.

14. The apparatus of claim 8, wherein the reverse saturation current measurements at multiple diodes can be aggregated to provide an average temperature of the microprocessor.

* * * * *